United States Patent
Tham et al.

(10) Patent No.: US 8,048,465 B2
(45) Date of Patent: Nov. 1, 2011

(54) METHODS FOR PRODUCING ELBOW-SHAPED CRACKERS

(75) Inventors: Kenchu A. Tham, Sparta, NJ (US); Edward Kevin McHugh, Oakland, NJ (US); Steven Peter Zubanas, Verona, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 446 days.

(21) Appl. No.: 12/364,773

(22) Filed: Feb. 3, 2009

(65) Prior Publication Data

US 2010/0196571 A1   Aug. 5, 2010

(51) Int. Cl.
A23P 1/10   (2006.01)

(52) U.S. Cl. ........ 426/560; 426/502; 426/503; 426/505; 426/517; 426/518; 426/523; 426/808

(58) Field of Classification Search .......... 426/549, 426/560, 502, 503, 505, 512, 517, 518, 523, 426/808; D1/128, 199
See application file for complete search history.

(56) References Cited

U.S. PATENT DOCUMENTS

| | | | |
|---|---|---|---|
| D16,848 S | 8/1886 | Stauffer | |
| D16,849 S | 8/1886 | Stauffer | |
| 724,609 A | 4/1903 | Peters | |
| 2,615,809 A | 10/1952 | Jean | |
| 3,520,248 A | 7/1970 | Mackendrick | |
| D242,188 S | 11/1976 | Vondell et al. | |
| 4,138,938 A | 2/1979 | Kitamura | |
| 4,247,567 A | 1/1981 | Momiyama | |
| 4,276,800 A | 7/1981 | Koppa et al. | |
| 4,297,376 A | 10/1981 | Nelson et al. | |
| 4,469,476 A | 9/1984 | Cavanagh et al. | |
| 4,650,684 A * | 3/1987 | Penrose | 426/144 |
| 4,818,207 A | 4/1989 | Heron | |
| 4,844,919 A | 7/1989 | Szwerc | |
| 4,865,862 A | 9/1989 | McFeaters et al. | |
| 5,037,350 A * | 8/1991 | Richardson et al. | 452/174 |
| 5,063,839 A | 11/1991 | McFeaters et al. | |
| 5,306,133 A | 4/1994 | Dayley | |
| 5,388,489 A | 2/1995 | Dayley | |
| 5,529,799 A * | 6/1996 | Bornhorst et al. | 426/549 |
| 5,549,467 A | 8/1996 | Schultz | |
| D474,873 S | 5/2003 | Frazee | |
| D475,173 S | 6/2003 | Frazee | |
| 6,953,596 B2 * | 10/2005 | Maniak et al. | 426/503 |
| D609,878 S * | 2/2010 | Tham et al. | D1/128 |
| 7,914,834 B2 * | 3/2011 | Fu et al. | 426/503 |
| 2005/0226981 A1 * | 10/2005 | Flook et al. | 426/503 |
| 2006/0040020 A1 * | 2/2006 | Maric | 426/104 |

\* cited by examiner

*Primary Examiner* — Drew E Becker
(74) *Attorney, Agent, or Firm* — Fitch, Even, Tabin & Flannery

(57) ABSTRACT

A method of forming elbow-shaped crackers using a die cutter is provided. By one approach, the method includes first preparing a cracker dough, and then sheeting the cracker dough to form a dough sheet having a thickness. Next, the formed dough sheet is advanced through a die cutter to form a plurality of elbow-shaped dough pieces from the dough sheet. The formed dough pieces have a non-symmetrical degree of curvature between top and bottom sides thereof so that the formed dough pieces have a recognizable elbow-shaped configuration and the plurality of formed dough pieces are nested together by the die cutter so that there is no sheeted cracker dough remaining between adjacently nested dough pieces.

12 Claims, 5 Drawing Sheets

US 8,048,465 B2

METHODS FOR PRODUCING ELBOW-SHAPED CRACKERS

FIELD

The field relates to methods for producing cracker products, and more specifically, to methods for producing elbow-shaped cracker products using a cutting die.

BACKGROUND

Cracker products are generally formed by cutting out the desired shape of the cracker from a sheet of cracker dough and baking the cracker dough to form a baked cracker product. Various approaches can be used to form the dough and cut the dough into pieces having the desired shapes for baking. For example, individual cutters or molds may be used to form the cracker dough into a desired shape. More automated processes involve the use of cutting dies which define the shape of the prebaked dough piece. The cutting die may be attached to a reciprocating cutting plate or a rotary cutting drum. In many instances, the rotary cutting dies are often desirable because sheets of cracker dough can be fed to the rotary cutting die and cut into their desired dough shaped pieces in a continuous process to increase throughput.

When using the cutting die, it is generally desirable to reduce an amount of scrap material or dough not formed into a cracker shape, which can occur along the edges of the dough sheet or through spaces between the individual cutting dies disposed on the cutter. Various configurations for the production of cracker products using cutting dies exist; however, each may have shortcomings when applied to non-symmetrical or thin shapes, such as elbow-shaped crackers. For example, it is relatively straightforward to form rectangular shaped crackers using cutting dies because the cutting blade defining the rectangular crackers may be easily positioned adjacent and even abutting each other to minimize and eliminate such waste. Positioning non-symmetrical cutting blades on a cutter die in a fashion similar to rectangular shapes tends to result in increased waste and decreased throughout With round shaped crackers, other difficulties need to be addressed to form an efficient cutting die. Because of their round shape, the adjacent edges of the cutting blades utilized for forming round dough shapes cannot be positioned to eliminate waste, thereby forming rework of dough during cutting due to the material between the cutting blades. Processes that use rotary dies generally anticipate such rework and include processing steps to separate and recycle the dough portions between the cutting blades. In general, cutting dies used to form cracker products having a round shape may result in up to about 30 to about 33 percent scrap material or rework, thus decreasing throughput, and increasing waste or adding expense due to complicated recycle and rework processes. In some instances, the circular shapes can be nested and closely spaced to reduce the waste/rework, but the constraint of the circular shapes tend to result in some level of waste or rework due to unused dough between the cutout die blades. Again, applying the techniques suitable for circular cutting blades to form cutters for non-symmetrical shapes tends to result in unacceptable waste and throughput.

While the designer of a cutting die will generally arrange the cutting blade shapes on the die surface to reduce unusable portions, the nature of the round or rectangular shapes as described above presents a relatively straight forward cutting blade arrangement process to produce the most efficient die configuration. With rectangular or round crackers, there is generally a single degree of freedom with die construction, which is positioning the cut out blades in the best possible nested or abutting configuration to minimize or eliminate un-used material between the cut-out blades. With non-symmetrical shapes and less conventional shapes, such as relatively thin, elbow-shaped cutouts, the traditional placement of cutting blades on a die surface to achieve the desired cutout is not a straight forward process due to many more degrees of freedom that must be considered. For instance, when forming a die to cut out non-symmetrical shapes and especially relatively thin non-symmetrical shapes such as elbow shapes, not only does the nesting configuration need to be selected, but the particular shape itself, any curvature of the shape, weight, thickness and width of the shape all must also be considered. Adjusting one of these parameters tends to substantially affect the configuration of the die. The difficulty lies in the constraint that the formed cracker needs to retain its non-symmetrical appearance, but still be formed using a robust cutting die and sheeting process to produce the cutout shapes with good through put and minimal breakage.

DETAILED DESCRIPTION OF THE PREFERRED EMBODIMENT

Referring to the Figures, an exemplary process and die configuration for forming elbow-shaped crackers is illustrated using a cutting die configured to produce good throughput and with minimal product breakage. The shape of the elbow crackers are specifically configured to not only represent a recognizable elbow-shape, but at the same time have a configuration that is effective to be produced on a scrap-less cutting die in which substantially no unused material is left between adjacently cut pieces. To this end, the elbow shaped crackers have a specific curvature of the top and bottom arcs forming the cracker shape, which retains the elbow-shaped configuration and permits a nesting arrangement with little to no displacement cavities between adjacent die cutouts that enables the scrap-less configuration of the die.

In general, a cracker dough is first formed by mixing the dough ingredients and proofing the dough to form the cracker dough. Next, the cracker dough is sheeted to a desired thickness for the particular application. The dough sheet is then advanced to a cutting die, which is preferably a rotary cutting die, where it is subjected to a plurality of elbow shaped cutting blades positioned on an outer surface of the cutting die to perforate the dough sheet into a plurality of elbow-shaped dough pieces. The formed elbow-shaped dough pieces are then baked in an oven at a temperature and time to form the elbow-shaped crackers. After baking, optional finishing steps may be carried out, such as applying oil to the crackers, applying a seasoning, flavor and/or salt to the cooked cracker prior to packaging. The dough weight, moisture level, and shape are combined to enable the cracker to be formed with low breakage, such as less than about 15 percent and, preferably, less than about 5 percent breakage.

The cutting die has a blade configuration selected to produce dough pieces having both a recognizable elbow-shape and, at the same time, also allow the dough sheet to be cut with substantially no wasted material between adjacently cut dough pieces to produce good throughput. By one approach, each individual dough piece (and the die blades configured to form such dough piece) has a configuration including degree of curvatures of the top and bottom sides, angle of inclination of the dough piece ends, dough weight, and outer surface areas that result in the recognizable elbow-shapes and, at the same time, also permit the arrangement of cutting die blades on the cutter surface to form such shapes that can be nested together so that the formed dough sheet is substantially free of material between die cavities. Changes in dough piece configuration, size, weight, or curvatures result in either a shape that does not resemble a recognizable elbow shape or results in a die configuration with waste product between die cavities.

Figure 1:
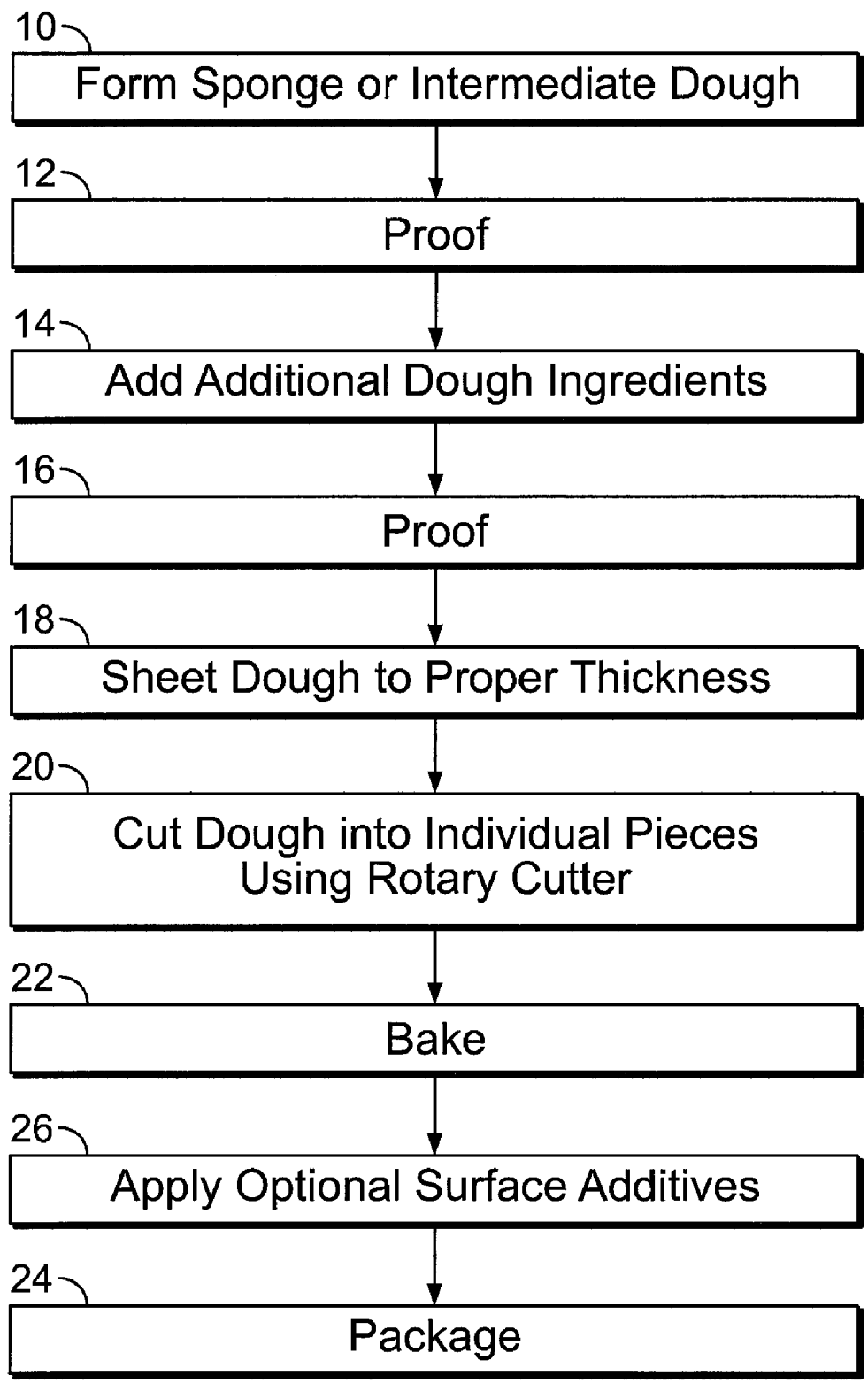
FIG. 1 is a flow diagram of an exemplary process for producing elbow shaped crackers.

Turning to FIG. 1, an exemplary process of forming elbow-shaped crackers using a cutting die is provided. First, dough is prepared by initially mixing 10 sponge ingredients to form a sponge or intermediate dough. The ingredients included in the first mixing step generally include flour, yeast, enzyme, color, and water that are blended together in one or more steps to form the sponge or intermediate dough. Next, the intermediate dough is proofed 12 to form a proofed intermediated dough. Next, additional ingredients are mixed with the proofed intermediate dough in a second mixing step 14 to form a final dough, which may be proofed 16 for a second time to form a cracker dough. The additional ingredients included in the second mixing step generally include flour, oil, salt, leavening agents, butter, cheese, and flavors.

According to one approach, the cracker dough is then formed into a continuous dough sheet 18 having a desired thickness correlating to a desired thickness of the formed dough pieces prior to baking. To form the sheet, the cracker dough may be advanced through one or more pairs of sheeting rollers flattening the cracker dough into a continuous dough sheet with a generally uniform thickness. To attain the desired thickness, the final dough may be subjected to several pairs of sheeting rollers arranged in series to gradually press the final dough into a dough sheet. By one approach, the dough sheet is rolled until it has a generally uniform thickness of about 0.030 to about 0.040 inches. While the above described approach may be used to form the dough into the desired thickness, it will be appreciated that other suitable methods may also be used.

The dough sheet is next advanced to a cutting die, preferably a rotary cutting die where the dough sheet is cut 20 into individual dough pieces having the recognizable elbow shapes with no dough material left between each formed elbow-shaped piece. As discussed in more detail below, the unique shape of the elbow dough piece is what enables the arrangement on the cutting die to produces substantially no wasted material between adjacent cut pieces. Finally, the dough pieces are baked 22 in an oven sufficient to obtain the desired moisture level and then packaged 24. Optionally, flavors, additives, and coatings may be applied 26 to the outer surface of the baked cracker. By one approach, an oil coating, salt, and or other cheese-based seasonings may be applied to the baked cracker prior to packing.

Figure 2:
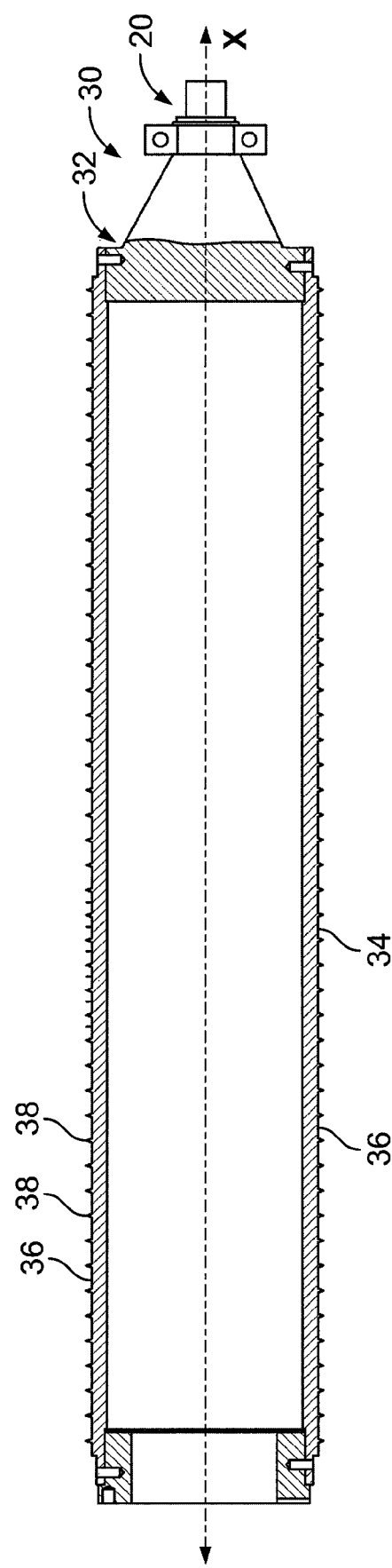
FIG. 2 is a side cross-sectional view of an exemplary rotary die cutter.

As mentioned, it is preferred that the cutting die is a rotary die 30, an example of which is shown in FIG. 2, where individual dough pieces are cut away from the dough sheet as it passes beneath the rotary die cutter 30. According to this approach, the rotary die cutter 30 is a cylindrical drum 32 having an outer surface 34 with a plurality of cutting die cavities 36 disposed laterally across and peripherally around the outer surface 34. The plurality of cutting die cavities 36 are formed from cutting knives 38 arranged in a wavelike or sinusoidal pattern across the outer surface 34 of the drum 32 (see, e.g., FIG. 5), which is effective to allow a nesting arrangement of the die cavities 36 in a manner that eliminates unused or wasted dough portions between individual cut dough pieces. As explained more below, the individual cutting die cavities 36 are formed from the cutting knives 38 arranged about a periphery 40 of the die cavity 36 to form the shape of the elbow-cracker, where the periphery 40 has a top side 41 with a top or major curvature 42 and a bottom side 43 with a bottom or minor curvature 44 (FIG. 3) to produce the recognizable elbow-shaped dough piece and, at the same time, to also enable the sinusoidal nested arrangement of the plurality of die cavities 36 on the die 30 to form the scrap-less cutting die (see FIGS. 5 and 6).

By one approach, the top degree of curvature 42 of the top side 41 of the cracker shape is different from the bottom degree of curvature 44 of the bottom side 43 of the cracker shape. To this end, such combination of non-symmetrical major and minor curvatures 42 and 44 permit the dough to be cut into the recognizable elbow-shape, but still allow for the sinusoidal nesting pattern to produce a scrap-less cutting blade with substantially no unused material between adjacent cutting pieces. The curvatures will be explained in more detail below in reference to FIG. 7 and Table 1.

Returning to FIG. 2 for a moment, the cylindrical drum 32 is rotatably mounted in a frame (not shown) along its axis X and positioned with its axis X substantially perpendicular to a direction of conveyor travel of the dough sheet. The drum 32 includes the peripheral surface 34 on which the cutting dies 36 are disposed. In this approach, the drum 32 is positioned above a conveyor (not shown) upon which the dough sheet is advanced in a position to receive the dough sheet. The drum 32 is offset vertically a distance from the conveyor surface approximately equal to the dough sheet thickness.

Figure 4:
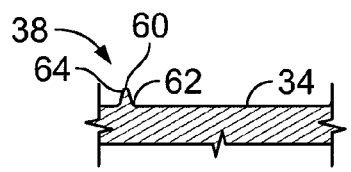
FIG. 4 is a cross-sectional side view of a cutting die blade.

Turning to FIG. 4, each cutting knife 38 extends radially from the drum peripheral surface 34 of the rotary cutting die 30, with a lower edge 62 disposed on the peripheral surface 34 of the drum 32 and extending radially therefrom with an upper cutting edge 60 radially spaced from the drum surface 34. The cutting knives 38 should have a height, measured from the lower edge 62 to the upper cutting edge 60 that is approximately equal to or slightly larger than the generally uniform thickness of the dough sheet. In this regard, when the cutting knives 38 engage the dough sheet as it passes thereunder, the cutting knives 38 will penetrate through the dough to form and cut the elbow-shaped dough pieces.

Figure 3:
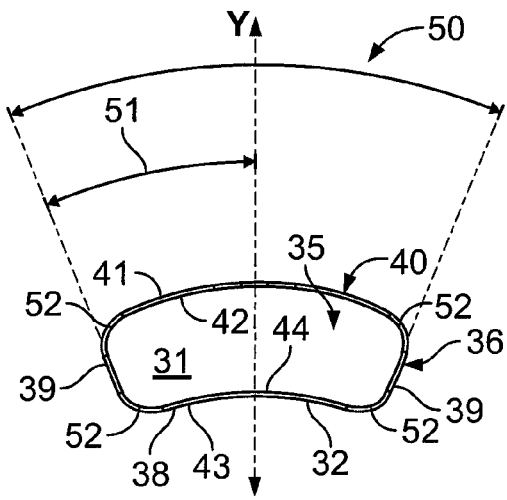
FIG. 3 is top plan view of an exemplary cutting die cavity.

Turning to more of the specifics, one preferred configuration of the cutting die cavity 36 will be discussed with reference to FIG. 3. Each individual cutting die cavity 36 has the periphery 40 in the form of elbow shaped die cups 31 defining elbow shaped recesses 35 therein. The elbow-shaped die cups 31 are defined by the spaced and curved top and bottom sides 41 and 43, respectively, and a pair of spaced end portions 39. As mentioned above, the curved top and bottom sides 41 and 43 each have a degree of curvature 42 and 44, respectively, that are preferably different from each other and therefore, the top and bottom sides are not symmetrical. That is, the top and bottom sides do not extend in a parallel fashion to each other.

The spaced end portions 39 are inclined inwardly relative to one another defining an angle 50 or 51 therebetween. In one approach, the included angle 50 of the end portions 39 ranges from about 20 to about 40 degrees, and preferably about 40 degrees. Alternatively, the angle can be defined as the angle of the end portion 39 relative to a horizontal axis Y bisecting the cavity 36. In this case, the angle 51 would generally be between about 10 and about 20 degrees and, preferably, about 20 degrees. Additionally, the elbow shaped die cups 31 include curved corner junctures 52 formed at intersections between the end portions 39 and the top side 41 and bottom sides 43.

The die cavity 36 is configured to cut a dough piece having a surface area of about 0.6 to about 0.8 square inches and a dough weight of about 0.7 to about 0.8 grams (about 7 to about 8 grams per 10 dough pieces), which has been identified as important to form a dough piece and cracker product resembling the recognizable elbow-shape and also permit the product to be produced with little to no breakage. Less surface area generally increases the amount of product breakage and greater surface area typically does not resemble a typical-elbow shaped pasta noodle, which the cracker is intended to resemble.

Figure 5:
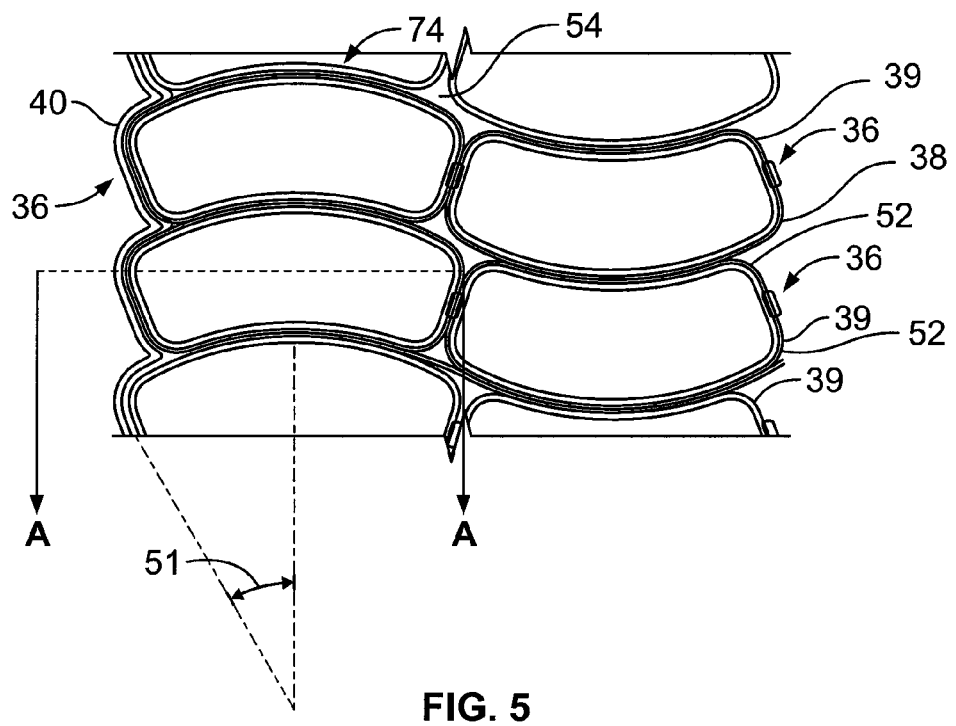
FIG. 5 is a top plan view of a plurality of cutting die cavities.
Figure 6:
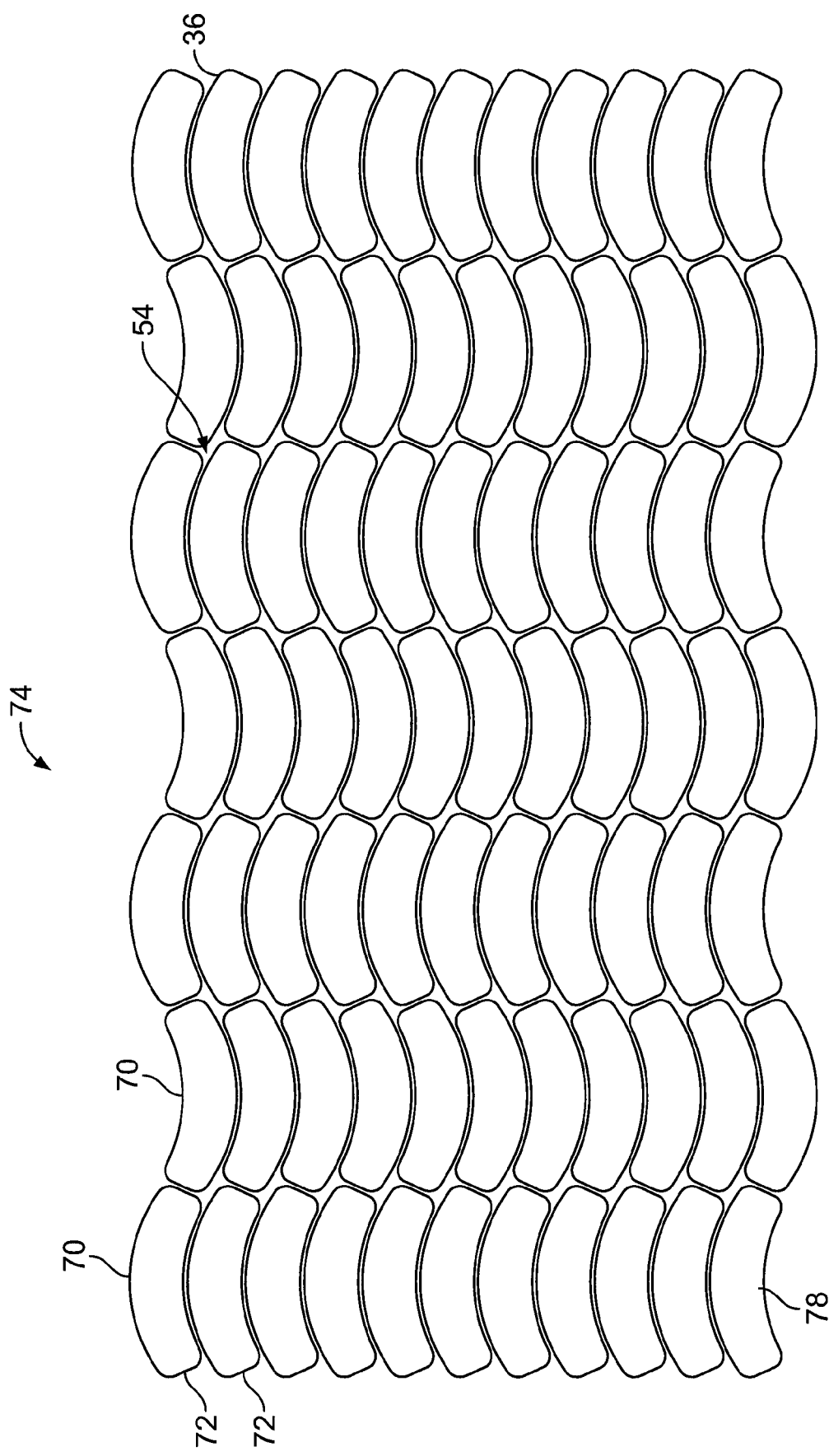
FIG. 6 is a top plan view of a plurality of cutting die cavities showing a nesting arrangement thereof.

As shown in FIGS. 5 and 6, an example of a preferred nesting arrangement 74 of the individual die cavities 36 to produce a scrap-less die for elbow-shaped crackers that can also form the recognizable elbow shapes at the same time. By one approach, the nesting arrangement 74 is in a sinusoidal pattern across the surface 34 of the drum 30. To achieve such nesting, it is the combination of the angle 50 of the end portions 36 relative to one another combined with the surface area and non-symmetrical curvatures 42 and 44 of the top and bottom sides 41 and 43 that permit the nesting arrangement 74 in such sinusoidal arrangement pattern with little to no space between the adjacent die cavities 36. In particular, such configuration produces a nesting arrangement with a displacement area 54 between each adjacently positioned die cavity 36 that enables scrap-less cutting even with such non-symmetrical elbow-shaped dies. This displacement area 54 is formed at each area of intersection of four adjacently positioned elbow-shaped die cups 31 as shown in FIG. 5. If the displacement area 54 is too large, it will press an excessive amount of the dough sheet against the conveyor during cutting by the rotary cutting die 30 to form dough waste. Dough waste formed from the displacement area 54 is not baked to form crackers and thus reduces throughput. It is the combination of the selected curvatures 42, 44, angles 50, and surface area of the dough piece that enable such nesting arrangement. In order to minimize or prevent an amount of waste dough from being formed during the cutting step, the nesting pattern 74 of the elbow shaped die cups 31 described above and an degree of curvatures 42 and 44 of the top and bottom sides 41 and 43 of the elbow shaped die cups 31 are utilized to form the perforations in the dough sheet.

Figure 7:
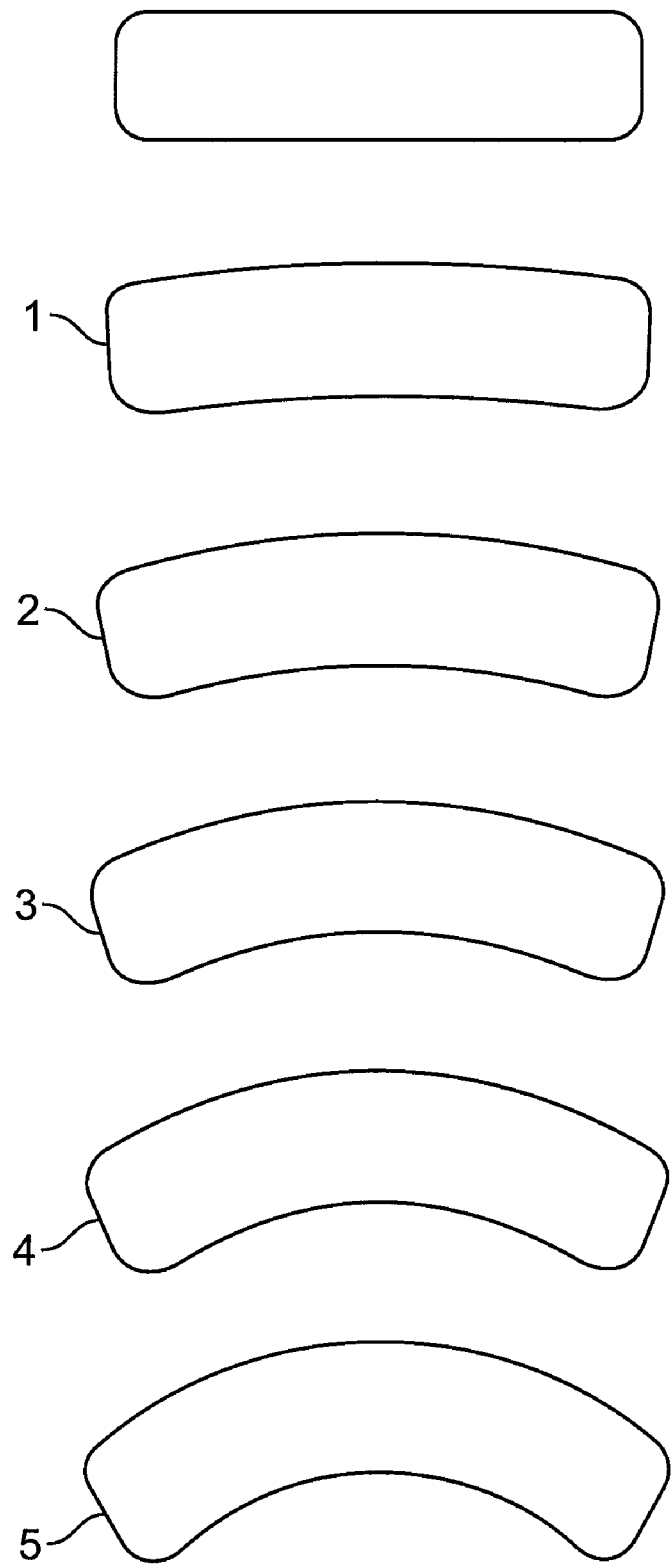
FIG. 7 is a top plan view of different degrees of curvature of cutting die cavities.

The degree of curvature 42 and 44 of the top and bottom sides 41 and 43, respectively, is a measure of the curvature of each side and is generally related to the length of that side. This curvature can be defined by the effective diameter of the curve (D in inches), effective angle (A in degrees), sweep (S in degrees), and arc length (L in inches) of the curve. By one approach, the degrees of curvature 42 and 44 are different by about 1 to about 4 percent, which enables each elbow shaped die cup 31 to be nested closely in the sinusoidal pattern 74. That is, the bottom side 43 has a tighter degree of curvature ranging between about 1 to about 4 percent over the curvature of the top side 41. As shown in FIG. 7 and in Table 1 below, acceptable degrees of curvature are defined by samples 2, 3, and 4. Samples 1 and 5 which are relatively flat or overly curved did not have acceptable degrees of curvature because they either did not resemble an elbow shape (such as with sample 1), or they did not allow the scrap-less nesting arrangement 74 (such as sample 5).

TABLE 1

| | | Degrees of Curvature | | | | | | | |
|---|---|---|---|---|---|---|---|---|---|
| | | Top side 41 | | | | Bottom Side 43 | | | |
| Angle 51 | Sample ID | D | A | S | L | D | A | S | L | Result |
| 5° | 1 | 8.0 | 99.7 | 19.4 | 1.4 | 7.4 | 99.9 | 19.9 | 1.3 Unacceptable |
| 10° | 2 | 4.4 | 108.9 | 37.8 | 1.4 | 3.7 | 110 | 40 | 1.3 Acceptable |
| 15° | 3 | 3.16 | 117 | 55 | 1.5 | 2.4 | 119.9 | 59.9 | 1.3 Acceptable |
| 20° | 4 | 2.5 | 126 | 72.3 | 1.6 | 1.8 | 129.9 | 79.9 | 1.3 Acceptable |
| 25° | 5 | 2.2 | 134.3 | 88.6 | 1.7 | 1.5 | 139.9 | 99.9 | 1.3 Unacceptable |

It has been discovered that the degree of curvature, and particularly the non-symmetrical degrees of curvature of the top and bottom sides of the elbow shape, is related to the amount of waste between die cavities. A small difference in curvature between the top and bottom sides of the elbow-shaped is effective to form a nesting arrangement to produce the scrap-less cutting die. On the other hand, elbow shaped die cups 31 with too great a degree of curvature 42 and/or 44 could not be nested as tightly together. Specifically, when larger degrees of curvature 42 and 44 are used, the dough waste formed at the displacement areas 52 increased during rotary die cutting. On the other hand, too small of a degree of curvature did not form a dough piece having an elbow-shape.

Turning to FIG. 6, the plurality of cutting dies 36 are arranged into the wavelike or sinusoidal pattern 74 about the peripheral surface 34 of the drum 30. In practice, the two-dimensional pattern 74 of FIG. 6 is wrapped peripherally about the cylindrical drum 30 such that peripheral rows 70 of cutting dies 36 extend around the circumferential periphery of the drum 30 and lateral rows 72 of cutting dies 36 extend laterally or longitudinally across the drum 30. The individual cutting dies 36 defining elbow shaped recesses 35 are nested tightly together to form the peripheral rows 70 extending around the drum 30 so that the top side 41 of each cutting die 36 is nested adjacent the bottom side 43 of an adjacent cutting die 36 with ends 39 adjacent each other to form the lateral rows 72. It should be understood that when the two-dimensional pattern of FIG. 2 is wrapped around the peripheral surface of the cylindrical drum, the bottom side 43 of an uppermost cutting die 76 will be nested within the top side 41 of a lowermost cutting die 78, so that a continuous peripheral row 70 of cutting dies 36 is formed about the peripheral surface 34 of the drum 10. The distinct and non-symmetrical degrees of curvatures of the top and bottoms sides 41 and 43 enable such nesting.

Similarly, lateral rows 72 extend laterally across the surface of the drum 30. Laterally adjacent cutting dies 36 are flipped 180 degrees with respect to one another such that alternating cutting dies 36 have top sides 41 and bottom sides 43 facing opposite directions. So configured, the lateral rows 72 of cutting dies 36 form a wavelike or sinusoidal pattern. The lateral rows 72 should extend laterally across the drum 30 above the advancing dough sheet to a width as close to the edges of the dough sheet as possible to decrease the amount of dough waste formed along the edges of the rotary cutting die 31.

After cutting by the rotary cutting die, the formed dough pieces are advanced to an oven where they are baked to form cracker products. By one approach, the formed dough pieces are baked for a time and temperature sufficient to produce a cracker having a moisture level of about 2 to about 4 percent.

As mentioned above, the process described herein are also configured to produce a cracker with low level of breakage, such as below about 15 percent and preferably below about 5 percent. It was discovered that a combination of a dough weight of individual elbow shaped dough pieces between about 0.7 and about 0.8 grams combined with a dough moisture level of about 2 to about 3 percent formed crackers with such low levels of breakage. A final dough with a reduced water level below about 2 percent produces brittle crackers that did not necessarily fill the entire die cavity 36 and, therefore, were generally believed to be related to increases in breakage due to incompletely formed elbow shapes. Alternatively, a final dough with greater than about 3 percent moisture produced a dough that was too soft and clumpy and did not form uniform sheets, which also tended to result in incompletely formed elbow shapes.

In combination with the dough moisture level, it was also determined that the dough weight of individual cracker pieces was related to the level of breakage. For purposes herein, a cracker piece is considered whole (i.e., not broken) unless more than about 10 percent of the shape or weight is absent. For example, a final dough formed piece weighing approximately 0.6 grams produced crackers with an unacceptably high level of breakage at about 30 percent. With a moisture level between about 2 and about 3 percent with pieces weighing approximately 0.7 to about 0.8 grams produced crackers with dramatic drop in breakage to below about 15 percent and in some cases below about 5 percent. Along these lines, it was also discovered that the surface area of each elbow shape is also important to breakage. Preferred surface areas are between about 0.6 to about 0.8 square inches.

It will be understood that various changes in the details, materials, and arrangements of the process, formulations, and ingredients thereof, which have been herein described and illustrated in order to explain the nature of the method and resulting elbow-shaped crackers, may be made by those skilled in the art within the principle and scope of the embodied method as expressed in the appended claims.

What is claimed is:

1. A method of forming elbow-shaped crackers using a die cutter, the method comprising:
   preparing a cracker dough having a moisture level between about 2 and about 3 percent;
   sheeting the cracker dough to form a dough sheet having a thickness;
   advancing the dough sheet through a die cutter to form a plurality of elbow-shaped dough pieces from the dough sheet, the formed dough pieces having a non-symmetrical degree of curvature between top and bottom sides thereof so that the formed dough pieces have a recognizable elbow-shaped configuration and the plurality of formed dough pieces are nested together by the die cutter so that there is substantially no sheeted cracker dough remaining between adjacently nested dough pieces; and
   baking the dough to form an elbow-shaped cracker.

2. The method of claim 1, wherein the top side of the dough piece has a top degree of curvature and the bottom side of the dough piece has a bottom degree of curvature, wherein the top and bottom degrees of curvature are different.

3. The method of claim 2, wherein the top degree of curvature is about 1 to about 4 percent less than the bottom degree of curvature.

4. The method of claim 3, wherein the top degree of curvature is defined by an effective diameter of about 2.5 to about 4 inches, an effective angle of about 109 to about 126 degrees, a sweep angle of about 38 to about 72 degrees and an arc length of about 1.4 to about 1.6 inches, and the bottom degree of curvature is defined by an effective diameter of about 1.8 to about 3.7 inches, an effective angle of about 110 to about 129 degrees, a sweep angle of about 40 to about 80 degrees, and an arc length of about 1.3 inches.

5. The method of claim 1, wherein the adjacently nested dough pieces are positioned in sinusoidal shaped rows of adjacently positioned dough pieces.

6. The method of claim 5, wherein the adjacently nested dough pieces are rotated about 180 degrees from each other.

7. The method of claim 1, wherein the dough pieces have a surface area of about 0.6 to about 0.8 square inches.

8. The method of claim 1, wherein the dough pieces have a dough weight of about 0.7 to about 0.8 grams.

9. The method of claim 1, wherein the dough piece has spaced side edges that incline toward each other at an angle between about 20 and about 40 degrees.

10. The method of claim 1, wherein the cutter is a rotary die cutter.

11. The method of claim 1, wherein the dough sheet has a thickness of about 0.030 to about 0.040 inches.

12. The method of claim 1, wherein the elbow-shaped crackers exhibit less than about 15 percent breakage.

\* \* \* \* \*